United States Patent
Randazzo

(10) Patent No.: US 7,948,275 B2
(45) Date of Patent: May 24, 2011

(54) TRANSCEIVER WITH FAULT TOLERANT DRIVER

(75) Inventor: Todd Randazzo, Plymouth, MN (US)

(73) Assignee: LSI Corporation, Milpitas, CA (US)

( * ) Notice: Subject to any disclaimer, the term of this patent is extended or adjusted under 35 U.S.C. 154(b) by 567 days.

(21) Appl. No.: 11/971,682

(22) Filed: Jan. 9, 2008

(65) Prior Publication Data

US 2008/0170607 A1 Jul. 17, 2008

Related U.S. Application Data

(60) Provisional application No. 60/880,925, filed on Jan. 16, 2007.

(51) Int. Cl.
*H03B 1/00* (2006.01)

(52) U.S. Cl. ............. 327/108; 327/535; 326/81; 326/82

(58) Field of Classification Search .......... 327/108–112, 327/387–388, 392–394, 530, 534–535, 537, 327/545–546; 326/80–83, 86, 87
See application file for complete search history.

(56) References Cited

U.S. PATENT DOCUMENTS

| | | | |
|---|---|---|---|
| 5,160,855 A | 11/1992 | Dobberpuhl | |
| 5,381,059 A * | 1/1995 | Douglas | 326/58 |
| 5,933,025 A * | 8/1999 | Nance et al. | 326/81 |
| 6,914,456 B2 * | 7/2005 | Ajit | 327/108 |
| 7,276,957 B2 | 10/2007 | Bhattacharya et al. | |

\* cited by examiner

*Primary Examiner* — An T Luu
(74) *Attorney, Agent, or Firm* — Westman, Champlin & Kelly, P.A.

(57) ABSTRACT

A fault tolerant driver circuit includes a data output driver that receives an enable input and that includes a transistor formed on an isolation well. A well bias circuit provides a first well bias to the isolation well. The well bias circuit includes voltage-controlled impedances that are controlled by a voltage of the data output line, the enable input and a supply voltage. The voltage-controlled impedances connect the first well bias alternatively to: a common conductor through a first impedance when the supply voltage is ON and the enable input is ON; and a second impedance when the supply voltage is on and enable is OFF.

20 Claims, 8 Drawing Sheets

| STATE | INPUTS | | | OUTPUTS | |
|---|---|---|---|---|---|
| | VDDIO | ENABLE | IO | PDWELL | FW |
| A | 1 | 1 | 1 | LO-Z TO VSSIO | 1(VDDIO) |
| B | 1 | 1 | 0 | LO-Z TO VSSIO | 1(VDDIO) |
| C | 1 | 0 | 1 | HI-Z TO VSSIO | 1(VDDIO OR VIO, WHICHEVER IS GREATER) |
| D | 1 | 0 | 0 | HI-Z TO VSSIO | 1(VDDI0) |
| E | 0 | 1 | 1 | PULLED TO IO | 1(VIO) |
| F | 0 | 1 | 0 | PULLED TO IO | 0 |
| G | 0 | 0 | 1 | PULLED TO IO | 1(VIO) |
| H | 0 | 0 | 0 | PULLED TO IO | 0 |

FIG. 5

TRANSCEIVER WITH FAULT TOLERANT DRIVER

CROSS-REFERENCE TO RELATED APPLICATION

This application claims the benefit of U.S. Provisional Application Ser. No. 60/880,925 filed on Jan. 16, 2007 for inventor Todd Randazzo and entitled "Improved Non-Cascode Failsafe driver".

FIELD OF THE DISCLOSURE

The present disclosure relates generally to data transceivers, and more particularly, but not by way of limitation to failsafe drivers in data transceivers.

BACKGROUND OF THE DISCLOSURE

Data transceivers that connect in parallel to a communication medium are known. When all data transceivers connected to the communication medium are energized by separate systems, problems can arise when some transceivers are energized and other transceivers are de-energized. A de-energized transceiver can load the communication medium and present a fault that interferes with communication between energized transceivers.

A method and apparatus are needed to enable communication on a communication medium while tolerating faults from de-energized transceivers connected to the communication medium.

SUMMARY

Disclosed are a method and a fault tolerant driver circuit. The fault tolerant driver circuit comprises a data output driver. The data output driver receives an enable input and couples a data output to a data output line. The data output driver includes a transistor formed on an isolation well.

The fault tolerant driver circuit comprises a well bias circuit. The well bias circuit provides a well bias to the isolation well. The well bias circuit comprises voltage-controlled impedances that are controlled by a voltage of the data output line, the enable input and a supply voltage.

The voltage-controlled impedances connect the well bias to a common conductor through a first impedance when the supply voltage is ON and the enable input is ON. The voltage-controlled impedances connect the common conductor through a second impedance, which is higher than the first impedance, when the supply voltage is ON and the enable input is OFF.

BRIEF DESCRIPTION OF THE DRAWINGS

FIG. 5 illustrates a table of logic states for the well bias circuit shown in FIG. 4.

DETAILED DESCRIPTION OF ILLUSTRATIVE EXAMPLES

In one or more of the examples described below, a fault tolerant driver circuit comprises a data output driver that receives an enable input and that couples a data output to a data output line. The data output driver includes a transistor formed on an isolation well. A well bias circuit provides a well bias to the isolation well. The well bias circuit comprises voltage-controlled impedances that are controlled by a voltage of the data output line, the enable input and a supply voltage. The voltage-controlled impedances connect the well bias to a common conductor through a first impedance when the supply voltage is ON and the enable input is ON. The voltage-controlled impedance connect the well to the common conductor through a second impedance, which is higher than the first impedance, when the supply voltage is ON and the enable input is OFF.

Figure 1:
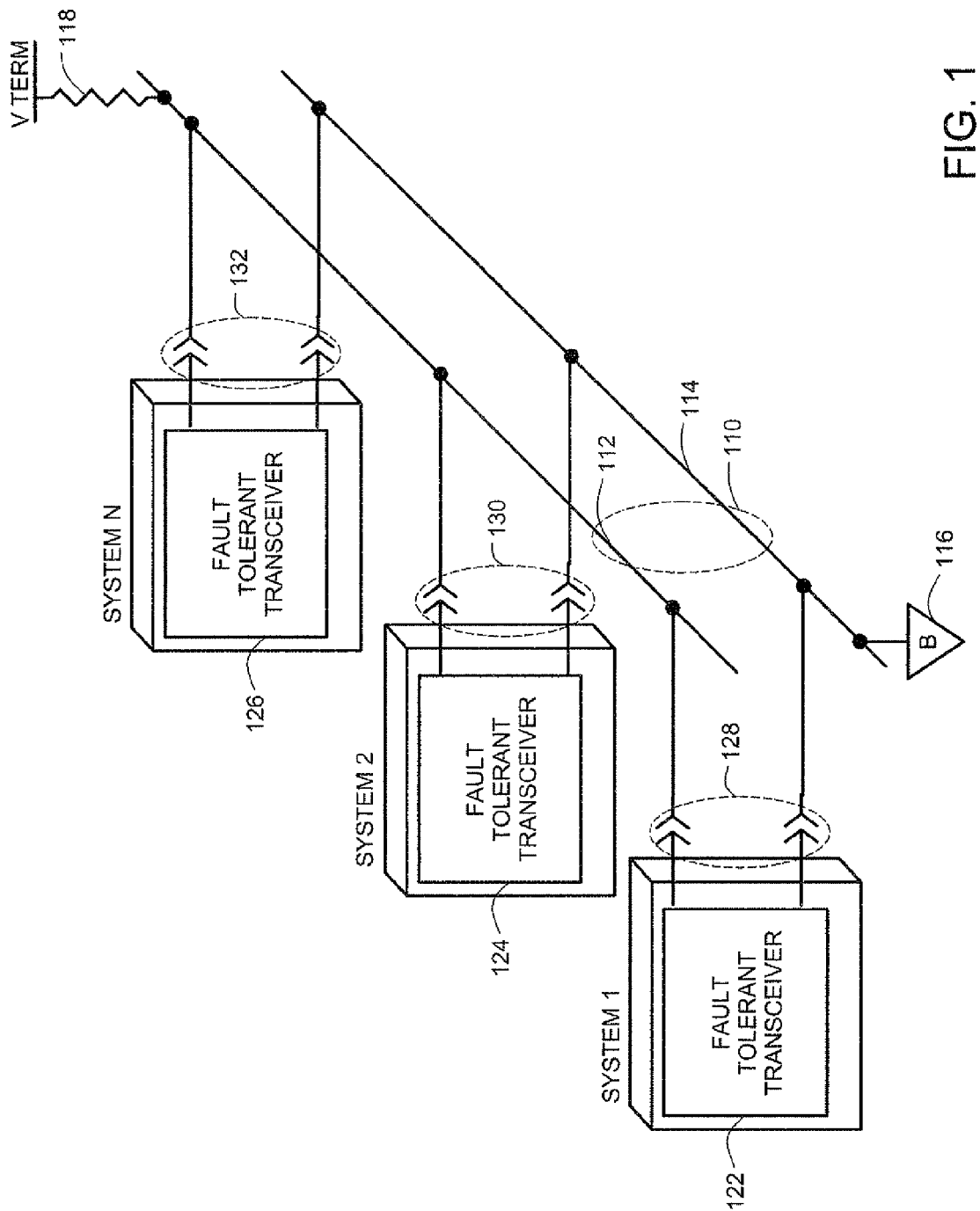
FIG. 1 illustrates multiple systems with fault tolerant transceivers that are connected to a communication medium.

FIG. 1 illustrates multiple systems 1, 2, . . . , N that are connected to a communication medium 110. The communication medium 110 comprises at least a first bus conductor 112 and a second bus conductor 114. The second bus conductor 114 is typically designated as a bus common conductor (bus reference conductor) as indicated by the schematic symbol 116. The first and second bus conductors 112, 114 can alternatively comprise a balanced line. According to one aspect, the communication medium 110 optionally comprises additional bus conductors (not illustrated) such as power supply lines, clock lines and the like. According to one aspect, the first bus conductor 112 is connected through an optional termination impedance 118 to a bias potential VTERM. The termination impedance 118 can also be referred to as a "pull up" or "pull down" impedance, depending on the polarity of VTERM.

The system 1 comprises a fault tolerant transceiver 122. The system 2 comprises a fault tolerant transceiver 124. The system N comprises a fault tolerant transceiver 126. The fault tolerant transceivers 122, 124, 126 are parts of different systems that can be separately energized or de-energized. The fault tolerant transceivers 122, 124, 126 couple to the first and second bus conductors 112, 114 through electrical connectors 128, 130, 132. The electrical connectors 128, 130, 132 do not comprise connections that are internal to an integrated circuit, but instead comprise demateable connections that are subject to mating or demating in a product assembly or end user environment.

The number of fault tolerant transceivers (such as fault tolerant transceivers 122, 124, 126 that are connected to the communication medium 110 at any one time can be one, two, or a larger number according to a configuration selected during product assembly or as selected by a user. The fault tolerant transceivers 122, 124, 126 are connected electrically in parallel with each other to the communication medium 100. A fault tolerant transceiver may be either energized or de-energized at the time that the fault tolerant transceiver is connected to the communication medium 100. A fault tolerant transceiver can be "hot plugged" into the communication medium. During use of the communication medium 110, one of more of the fault tolerant transceivers connected to the bus may be de-energized, while other fault tolerant transceivers are energized and communicating over the communication medium 110.

According to one aspect the fault tolerant transceivers 122, 124, 126 are arranged such that the fault tolerant transceivers 122, 124, 126 are not damaged by the various combinations of connections and disconnections described above. According to another aspect, the fault tolerant transceivers 122, 124, 126 are arranged such that the communication medium 110 operates to provide communication between connected, energized fault tolerant transceivers, even though some de-energized transceivers are connected to the communication medium 110. According to yet another aspect, the fault tolerant transceivers 122, 124, 126 are arranged such that power for energization does not feed along the communication medium. An energized fault tolerant transceiver can not feed substantial energization into a de-energized fault tolerant transceiver.

The communication medium 110 can comprise known conductor systems such cables, printed wiring board traces, card edge connectors, cable connectors and the like. The communication system 110 can comprise known communication protocols such as Parallel SCSI, 1394, USB and the like. According to another aspect, the communication medium optionally comprises multiple parallel communication media 110, and each system (such as system 1, for example) comprises multiple parallel transceivers.

Fault tolerant transceivers are described in more detail below by a way of an example illustrated in FIG. 2.

Figure 2:
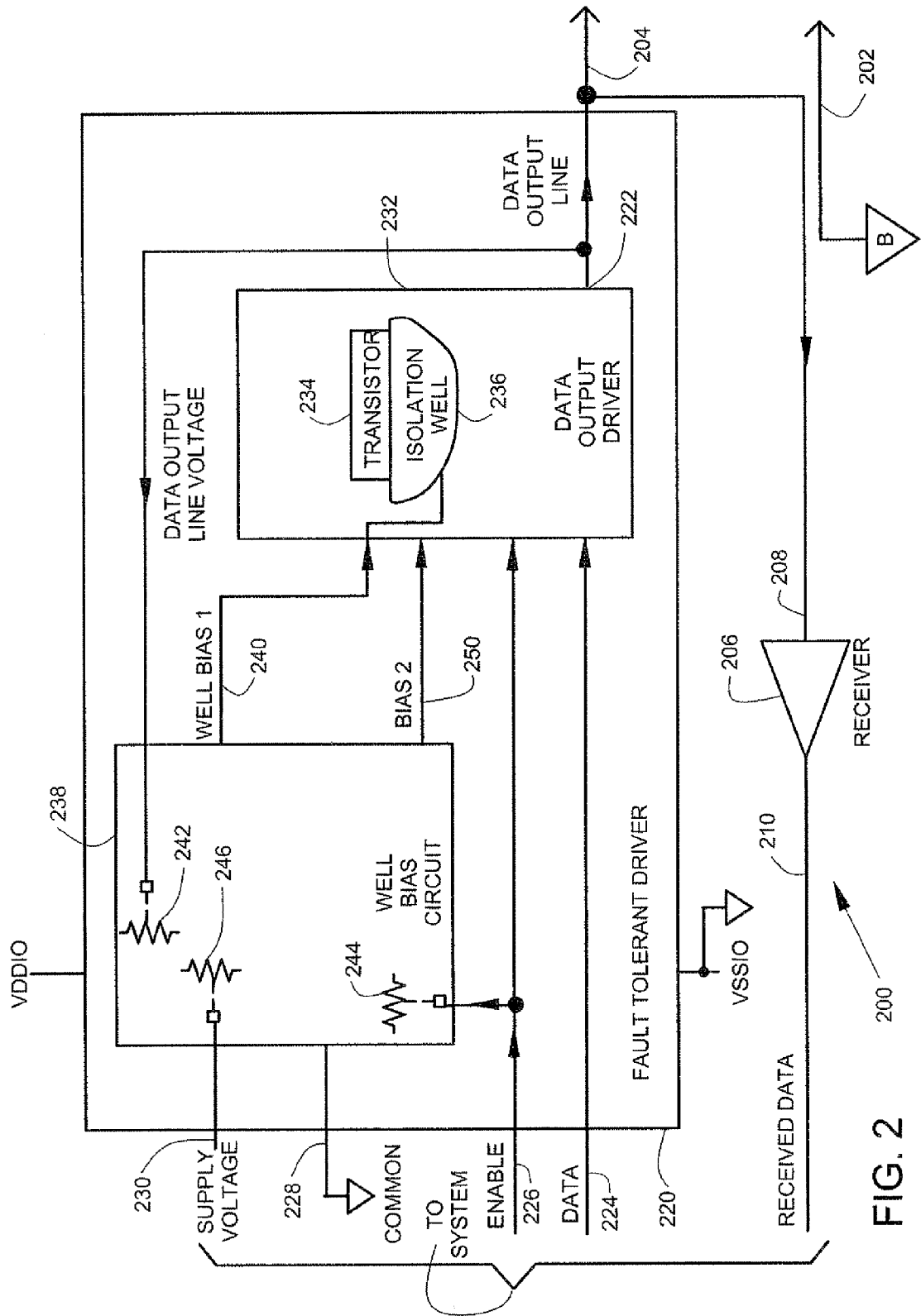
FIG. 2 illustrates exemplary aspects of a fault tolerant transceiver.

FIG. 2 illustrates exemplary aspects of a fault tolerant transceiver 200. According to one aspect, the fault tolerant transceiver 200 is part of an integrated circuit that includes an integrated circuit substrate (not illustrated). The fault tolerant transceiver 200 comprises a transceiver common conductor 202. The transceiver common conductor 202 is connectable to a second bus conductor such as bus common conductor 114 in FIG. 1. The fault tolerant transceiver 200 comprises a transceiver data conductor 204. The transceiver data conductor 204 is connectable to a bus conductor such as first bus conductor 112 in FIG. 1.

The fault tolerant transceiver 200 comprises a receiver 206. The receiver 206 comprises a receiver input 208 that couples to the transceiver data conductor 204. The receiver input 208 comprises a high impedance input, both when the transceiver 200 is energized and when the transceiver 200 is de-energized. The input impedance of receiver input 208 is sufficiently high to accommodate the fan-out capability that is specified for a communication medium to which the fault tolerant transceiver 200 is connected. The receiver 206 receives data from the transceiver data conductor 204 and provides the data on line 210. Line 210 couples to a system (such as system 1 in FIG. 1). The receiver 208 can include a suitable combination of level shifting, buffering, amplification, attenuation or inversion to be compatible with the physical layer levels on the transceiver data conductor 204 and with the system connected to line 210.

The fault tolerant transceiver 200 comprises a fault tolerant driver 220. The fault tolerant driver 220 comprises a driver output 222 that couples to the transceiver data conductor 204. The driver output 222 comprises an output that has at least a first logic level with a low impedance, and a second logic level with a high impedance when the fault tolerant driver is energized. The low impedance of driver output 222 is sufficiently low to accommodate the fan-out capability that is specified for a communication medium to which the driver output 222 is connected. According to one aspect the driver output 222 is compatible with a physical layer protocol called "wired OR" (also called open collector or open source) communication bus with a pull up resistor (such as termination 118 in FIG. 1). The fault tolerant driver 220 receives data on line 224 from the system and transmits data on line 204 to a communication medium. The driver 220 can include level shifting, buffering, amplification, inversion or attenuation as needed to be compatible with the physical layer levels on the transceiver data conductor 204 and the system.

The system provides an enable line 226 to enable the fault tolerant driver 220 to transmit data. The fault tolerant driver 220 receives energization from energization conductors VDDIO and VSSIO. VSSIO is also called a common conductor 228. VDDIO is also called supply voltage conductor 230. The system supplies energization to the common conductor 228 and the supply voltage conductor 230 for energizing the fault tolerant driver 220.

It is understood by those skilled in the art that the data line 224 and the enable line 226 can be any of various combination of positive or negative logic to accommodate the polarity of transistors used in the fault tolerant driver 220. DATA 224 can be alternatively /DATA (NOT DATA), and ENABLE 226 can be alternatively /ENABLE (NOT ENABLE) within the scope of the block diagram in FIG. 2. The data and enable lines can each also comprise multiple lines such that both positive and negative logic (DATA and NOT DATA, ENABLE and NOT ENABLE) are provided.

The fault tolerant driver circuit 220 comprises a data output driver 232. The data output driver 232 receives the enable input 226. The output driver 232 couples the data output 222 to the data output line 204. The data output driver 232 includes a transistor 234 formed on an isolation well 236. Isolation wells are known, and the isolation well 236 electrically insulates the structure of the transistor 234 from an integrated circuit substrate (not illustrated).

The fault tolerant driver circuit 220 comprises a well bias circuit 238. The well bias circuit 238 comprises voltage-controlled impedances 242, 244, 246 that are controlled respectively by a voltage of the data output line 222, a voltage of the enable input 226 and a voltage of the supply voltage 230. The voltage-controlled impedances in the well bias circuit 238 can comprise individual voltage-controlled impedances or combinations of multiple impedances, at least some of which are voltage-controlled impedances.

The well bias circuit 238 provides a well bias 240 to the isolation well 236. The well bias 240 comprises a voltage that can vary with respect to a substrate voltage. The well bias circuit attempts to drive the well bias 240 to the voltage of the supply voltage 230 or to the voltage of the data output line 222, whichever is higher.

According to one aspect, the well bias circuit 238 also provides a second bias 250 to the data output driver 232. This second bias 250 controls switches (transistors) which are used to bias both the gate and well of output transistor 234. The voltage-controlled impedances 242, 244, 246 connect the second bias 250 to: (a) the common conductor 228 through a first impedance when the supply voltage is ON and the enable input is ON; and (b) the common conductor 228 through a second impedances which is higher than the first impedance, when the supply voltage is ON and the enable input is OFF. These connections (a) and (b) of the second bias 250 are described in more detail below in connection with an example illustrated in FIGS. 4-7.

Figure 3:
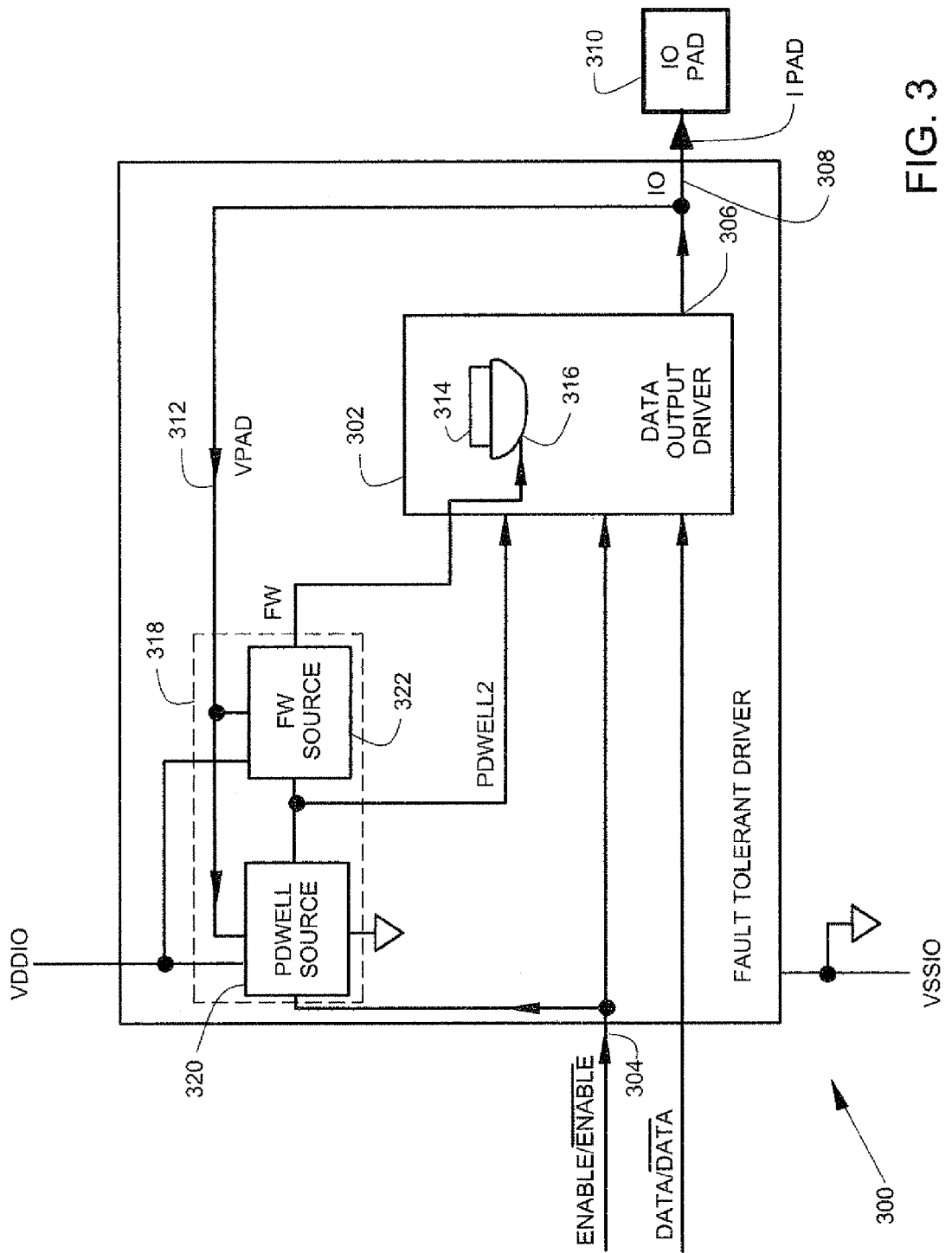
FIG. 3 illustrates a fault tolerant driver circuit.

FIG. 3 illustrates a fault tolerant driver circuit 300. The fault tolerant driver circuit 300 is similar to the fault tolerant driver circuit 220 in FIG. 2. The fault tolerant driver circuit 300 comprises a data output driver 302 that receives an enable input 304 and that couples a data output 306 to a data output line 308. The data output line 308 couples to an IO PAD 310. According to one aspect, the IO PAD 310 comprises a bonding pad of an integrated circuit that includes the fault tolerant driver 300. The bonding pad 310 is connectable by a bond wire (not illustrated) to a bus conductor (such as bus conductor 112 in FIG. 1). The data output driver 302 provides a current IPAD to the IO PAD 310. The data output driver 302 provides a voltage VPAD on line 312. The data output driver 302 includes a transistor 314 formed on an isolation well 316.

The fault tolerant driver circuit 300 comprises a well bias circuit 318. The well bias circuit 318 comprises a PDWELL SOURCE circuit 320 that provides a bias PDWELL2 to the switches (transistors) which control the gate and well potentials of output transistor 314. The PDWELL SOURCE circuit 320 comprises voltage-controlled impedances that are controlled by a voltage of the enable input 304, the supply voltage VDDIO and the voltage VPAD on line 312. The PDWELL SOURCE circuit 320 connects the well potential PDWELL 2 to (a) a common conductor through a first impedance when the supply voltage VDDIO is ON and the enable input is ON; and (b) the common conductor through a second impedance, which is higher than the first impedance, when the supply voltage VDDIO is ON and the enable input is OFF. Voltage-controlled impedances in the PDWELL SOURCE circuit 320 connect the first well bias PDWELL2 to the data output line voltage VPAD on line 312 when the supply voltage VDDIO is OFF.

According to one aspect, the well bias circuit 318 comprises an FW SOURCE circuit 322 that provides a well bias FW to the isolation well 316. This FW bias is a function of the data output line voltage VPAD on line 312, the first well potential PDWELL2 and the supply voltage VDDIO. The FW SOURCE circuit 318 is described in more detail below in connection with an example illustrated in FIG. 4.

Figure 4:
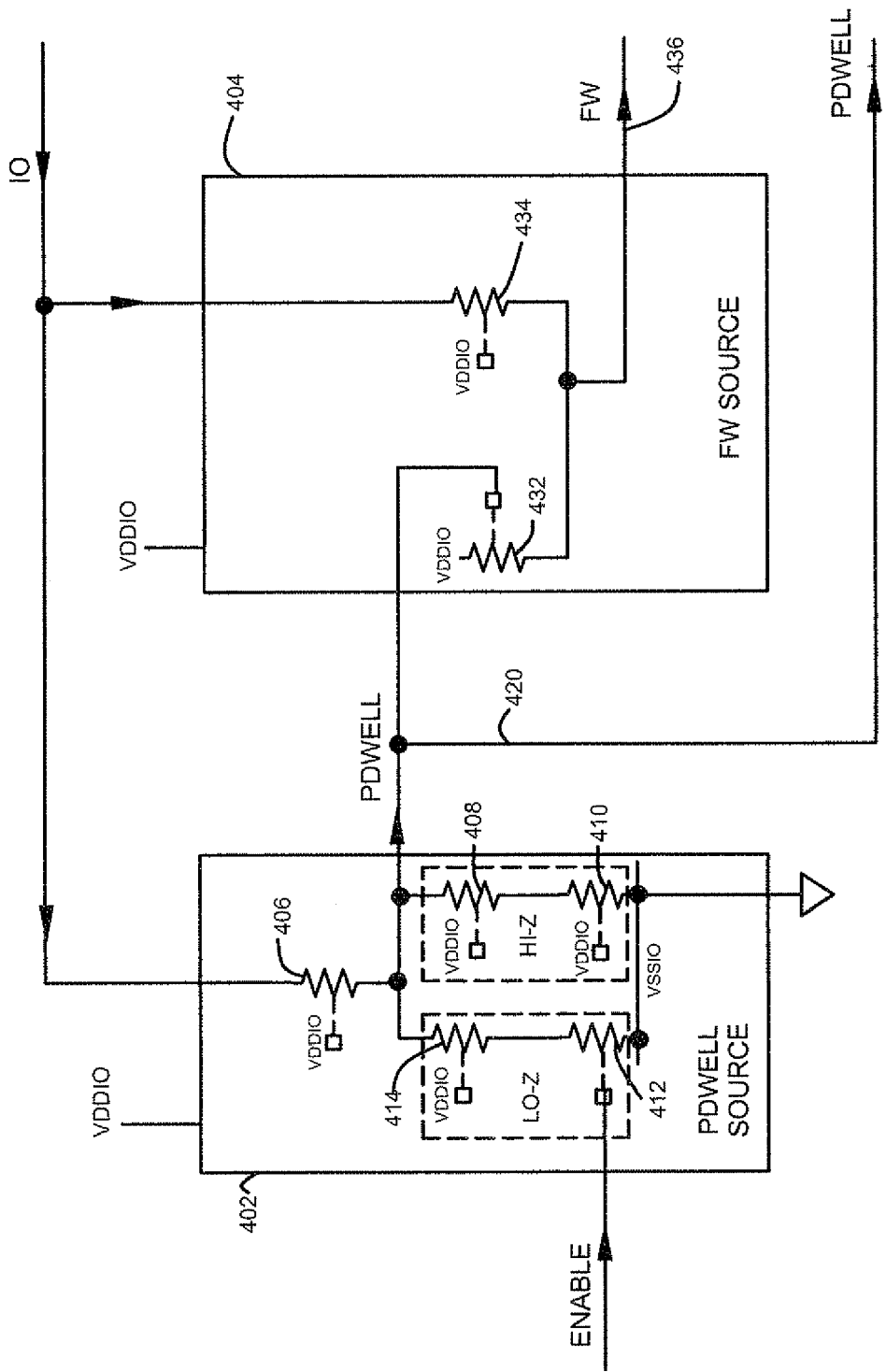
FIG. 4 illustrates a well bias circuit.

FIG. 4 illustrates a well bias circuit 400. The well bias circuit 400 comprises a first well source circuit PDWELL SOURCE 402 and a second source circuit FW SOURCE 404.

The first well source circuit 402 comprises voltage-controlled impedances 406, 408, 410, 412, 414. The voltage-controlled impedances 406, 408, 410, 412, 414 can be controlled to be in an ON state or an OFF state by the applied control voltage. The voltage-controlled impedances 408, 410 have relatively higher ON state impedances in comparison with ON state impedances of voltage controlled impedances 412, 414. The voltage controlled impedances 412, 414 have relatively lower ON state impedances.

The voltage-controlled impedances 406, 408, 410 414 have impedances that are controlled by supply voltage VDDIO. Voltage-controlled impedances 406, 408, 410, 414 change impedance depending on whether a system in which well bias circuit 400 is embedded is energized (VDDIO is high) or de-energized (VDDIO is near zero).

The voltage-controlled impedance 412 is controlled by ENABLE. The output data voltage (also called IO or VPAD) is provided as an input to the first well bias circuit 402. The first well bias circuit 402 provides the well bias PDWELL 420. The impedance at PDWELL and the potential to which PDWELL is pulled under various conditions of VDDIO, ENABLE and IO is set forth as logic states A-H in a logic table in FIG. 5.

The well bias circuit 400 comprises the second source circuit FWSOURCE 404. The second source circuit 404 comprises voltage-controlled impedances 432, 434. The voltage-controlled impedance 432 is controlled by the first well voltage PDWELL at 420. The voltage controlled impedance 432 is connected to the supply voltage VDDIO. The voltage controlled impedance 434 is connected to the output data voltage (also called IO or VPAD). The voltage controlled impedance 434 is controlled by the supply voltage VDDIO. The second source circuit FWSOURCE provides the second bias FW 436. The second bias 436 is illustrated in a logic table in FIG. 5 for logic states A-H.

FIG. 5 illustrates a table of logic states for the well bias circuit 400 shown in FIG. 4. The well bias circuit 400 has $2^3$ (eight) possible logic states A, B, C, D, E, F, G, H based on eight possible combinations of logic input states of inputs VDDIO, ENABLE and IO.

Figure 6:
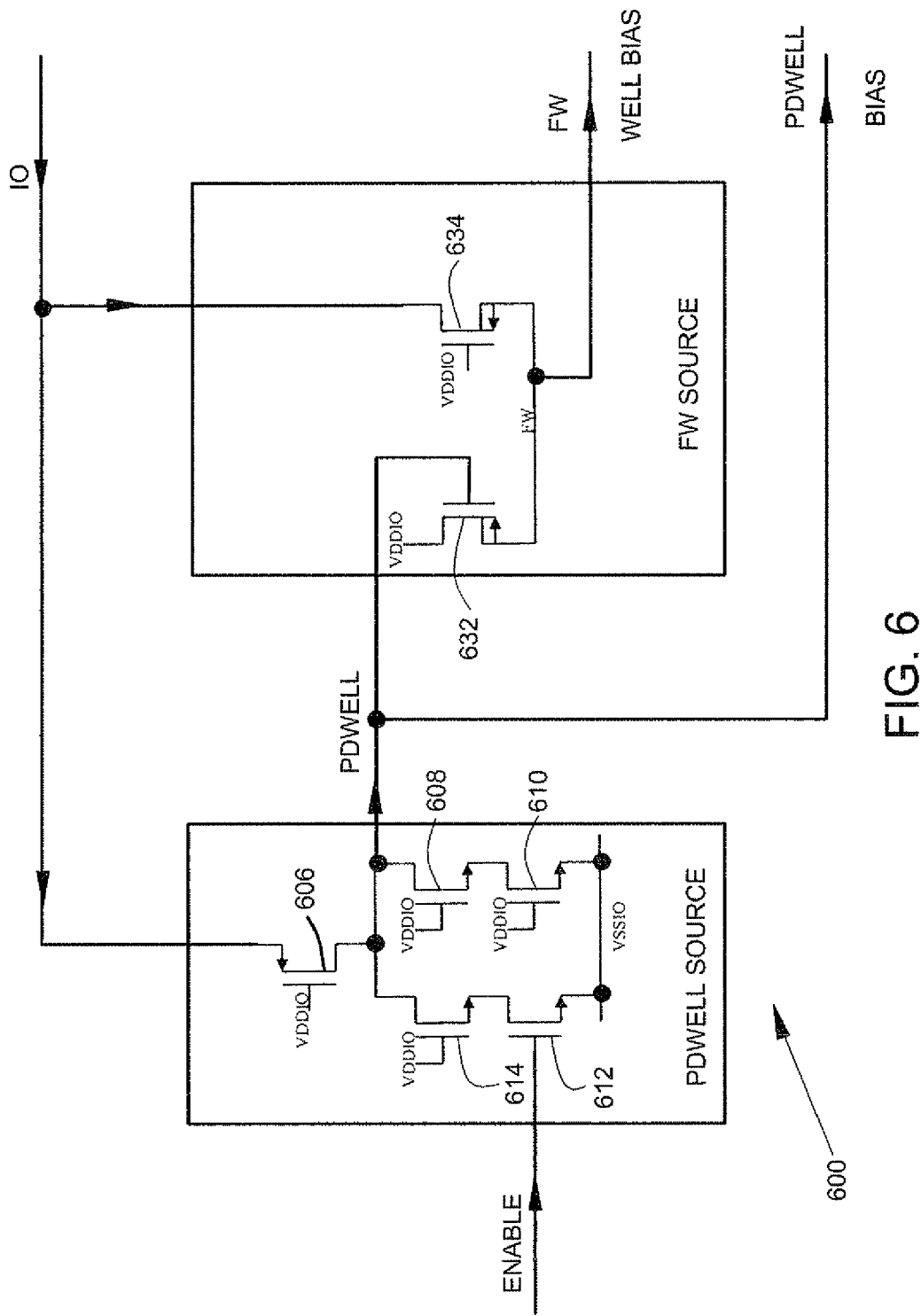
FIG. 6 illustrates a well bias circuit that includes field effect transistors.

FIG. 6 illustrates a well bias circuit 600. The well bias circuit 600 is similar to the well bias circuit 400 illustrated in FIG. 4 except that in FIG. 6, the voltage controlled impedances 606, 608, 610, 612, 614, 632, 632 comprise field effect transistors. In other respects, the well bias circuit 600 and the well bias circuit 400 are the same.

Figure 7:
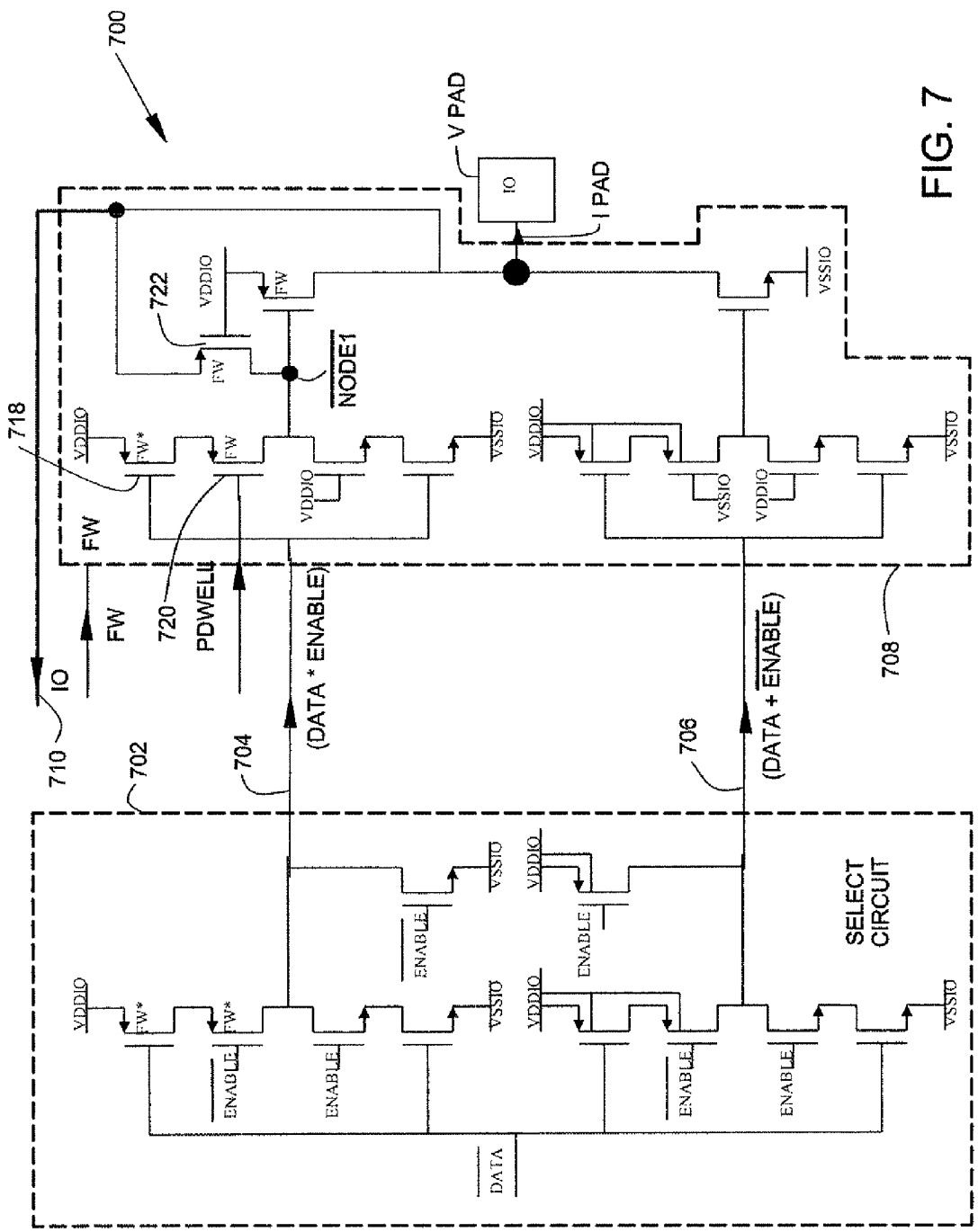
FIG. 7 illustrates a schematic of a data output driver circuit.

FIG. 7 illustrates an exemplary data output driver circuit 700. The data output driver circuit 700 receives input energization on conductors VDDIO, VSSIO from a system (not illustrated). The data output driver circuit 700 receives input potentials ENABLE, NOT ENABLE, NOT DATA from the system. The data output driver circuit 700 receives input well potentials FW and POWELL from a well bias circuit. The data output driver circuit 700 provides an output current IPAD to an IO pad at a potential VPAD. The potential at the IO pad is coupled along line 710 to the well bias circuit.

The data output driver circuit 700 comprises a network of interconnected field effect transistors as illustrated. The data output driver circuit 700 comprises a select circuit 702. The select circuit 702 logically combines the system voltage levels NOT DATA, ENABLE and NOT ENABLE and provides media voltage levels (DATA*ENABLE) 704 and (DATA*NOT ENABLE) 706.

The data output driver circuit 700 comprises an output stage 708. The output stage 708 receives (DATA*ENABLE) 704 and (DATA*NOT ENABLE) 706 from the select circuit 702. The output stage 708 receives voltages PDWELL and FW from a well bias circuit (such as well bias circuit 600 in FIG. 6). Field effect transistors in FIG. 7 that are isolated from a substrate by a well connected to FW are marked "FW". Field effect transistors that are isolated from the substrate by a well connected to either FW or VDDIO are marked "FW*" in FIG. 7. For transistors marked "FW*", the connection of an associated well to either FW or FDDIO is selected as matter of routing convenience for circuit conductors. The output stage 708 provides an output current IPAD at an output voltage VPAD. The output current IPAD and the output voltage VPAD are a function of the energization voltage VDDIO, DATA, ENABLE. The output current IPAD and the output voltage VPAD are also function of an external load from the connected communication medium (such as communication medium 110) and the external load from other data output drivers connected to the communication medium.

The output stage 708 provides a "failsafe" or "tolerant" driver architecture for high performance applications, particularly applications where there are mixed signals. Because the driver architecture is not a cascode architecture, higher performance is obtained with reduced area, reduced power and reduced pin capacitance. An outer P channel gate 718 is driven by cascode rather than through a pass gate. An inner P channel gate 720 is driven by the voltage PDWELL rather than VPAD. Referring back to FIG. 3, the FW source 322 uses PDWELL as an input. PDWELL has the following properties: (a) when unpowered, PDWELL is pulled to IO through a PMOS pass gate; (b) when powered and enabled, PDWELL is driven to VSSIO; (c) when powered and disabled, PDWELL is driven to VSSIO through a weak (high impedance) device; (d) when powered and disabled, the PMOS pass gate can overcome the weak pulldown, forcing POWELL to the IO voltage at sufficiently low IO currents to meet in-system requirements.

Unpowered, there is essentially no change; PMOS pass gates are used to pull the driver gate and well along with the IO voltage. Powered, however, both when the driver is enabled and when the driver is disabled, NODE1 NOT is cleanly passed to the driver well (since PDWELL is always low for all IO voltages between VSSIO and VDDIO. In the case where the circuit is powered and VDDIO is greater than VPAD, there is a small range of voltages where some PAD current is observed (see FIG. 8). The sizings of the devices in the PDWELL generation circuit (e.g., POWELL source in FIG. 6) are adjusted to meet system requirements for peak PAD current in this small range of voltages When IO>>VDDIO, then current flows through transistors 606, 608, 610. However, while IO voltage is overpowering the weak N channel transistors 608, 610, then current flows from IO through transistors 634, 632 to the VDDIO connection of transistor 632 (FIG. 6). When the IO voltage is overpowering the weak N channel transistors 608, 610, then current flows from IO through transistors 722, 720, 718.

A non-cascode failsafe architecture is provided which solves gate and well debiasing issues as follows: the last CMOS stage prior to the P channel driver comprises cascode P channels and cascode N channels; the gate of the inner N channel is at power (VDDIO) and the gate of inner P channel is at a voltage (PDWELL). PDWELL is generated as follows: (a) the well bias generator includes a PMOS pass gate which passes power (VDDIO) to the well is driven by POWELL. To generate POWELL, PDWELL is driven low (VSSIO) through a low impedance path when the driver is enabled, and is driven low through a relatively high impedance path when the driver is disabled, and a PMOS pass which drives PDWELL to the IO voltage for VPAD>VDDIO is capable of overcoming this high impedance pull-down path.

Figure 8:
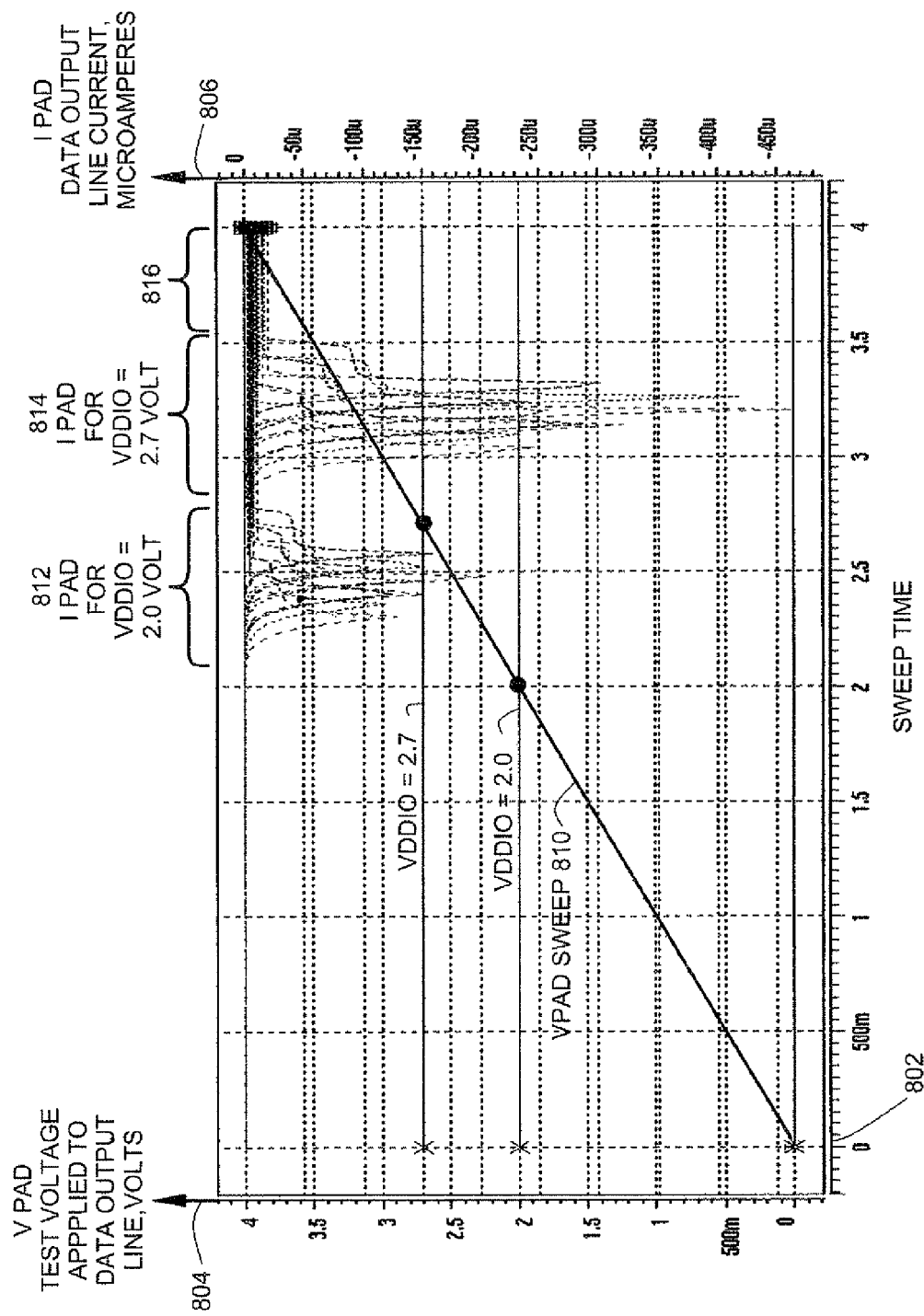
FIG. 8 illustrates a graph of tests of fault tolerant driver characteristics.

FIG. 8 illustrates a graph of tests of fault tolerant driver characteristics for a number of samples of fault tolerant drivers. In the tests, VPAD is controlled as a function of time, and IPAD is measured as a function of time. A horizontal axis 802 represents sweep time. A first vertical axis 804 represents an applied sweep voltage VPAD in volts. A second vertical axis 806 represents a measured current IPAD in microamperes. The sweep voltage VPAD is applied to the output (IO pad) of the output stage 708 in FIG. 8. The output stage 708 is in any idle state (not enabled) in which the output stage is a high impedance output state within the range of VSSIOI to VDDIO. The sweep voltage VPAD comprises a linear ramp waveform 810 starting at 0 volts at sweep time 0 and increasing linearly in time to a maximum of 4 volts at sweep time 4.

In a first series of tests, VDDIO is set to 2.0 volts and IPAD waveforms for several samples are recorded at 812. In a second series of tests, VDDIO is set to 2.7 volts and IPAD waveforms for the several samples are recorded at 814. With VDDIO set to 2.0 volts, IPAD current is essentially zero for VPAD voltages in the range of zero to VDDIO=2 volts, and peaks of IPAD current up ranging up to about 200 microamperes occur only above 2 volts. With VDDIO set to 2.7 volts, IPAD current is essentially zero for VPAD voltages in the range of zero to VDDIO=2.7 volts, and peaks of IPAD current up ranging up to about 450 microamperes occur only above 2.7 volts. The results in FIG. 8 illustrate that the fault tolerant driver provides essentially an open circuit in the output operating voltage range of VSSIO to VDDIO. There is significant current flow only in a narrow voltage range (at 812 or 814), and at higher voltages where VPAD>>VDDIO, there is only a small leakage current of about 5-20 microamperes as illustrated at 816. According to one aspect, the significant current flow occurs only during a transient time interval as the Voltage VPAD passes through the narrow voltage range.

Although the disclosure has been presented with reference to illustrative examples, workers skilled in the art will recognize that changes may be made in form and detail without departing from the scope of the disclosure.

What is claimed is:

1. A fault tolerant driver circuit, comprising:
a data output driver that receives an enable input and that couples a data output to a data output line, the data output driver including a transistor formed on an isolation well; and
a well bias circuit that provides a well bias to the isolation well, the well bias circuit comprising voltage-controlled impedances that are controlled by a voltage of the data output line, the enable input and a supply voltage, the well bias circuit providing a second bias to the data output driver, the voltage controlled impedances connecting the second bias to:
  (a) a common conductor through a first impedance when the supply voltage is ON and the enable input is ON; and
  (b) the common conductor through a second impedance, which is higher than the first impedance, when the supply voltage is ON and the enable input is OFF.

2. The fault tolerant driver circuit of claim 1 wherein the voltage-controlled impedances connect the well bias to the data output line voltage when the supply voltage is OFF.

3. The fault tolerant driver circuit of claim 1 wherein the transistor comprises a field effect transistor.

4. The fault tolerant driver circuit of claim 1 wherein the data output driver comprises a second transistor formed on a second isolation well, and the well bias circuit controls the second bias of the second isolation well.

5. The fault tolerant driver circuit of claim 1 wherein the voltage-controlled impedances comprise a first transistor with a relatively lower ON resistance and a second transistor with a relatively higher ON resistance, the first transistor controlling the first impedance and the second transistor controlling the second impedance.

6. The fault tolerant driver of claim 1 wherein the isolation well has a coupling to the data output line, the coupling to the data output line passing alternatively through the first or second impedance as a function of the enable input.

7. The fault tolerant driver of claim 1 wherein the second impedance comprises a sufficiently high impedance that the voltage of the isolation well can be pulled to substantially the voltage of the data output line.

8. The fault tolerant driver of claim 1 wherein the data output drive and the well bias circuit are formed on a substrate, and the isolation well isolates the transistor from the substrate.

9. The fault tolerant driver of claim 1 wherein the data output driver comprises an output stage coupled to the data output line and a select circuit coupled between the output stage and a system.

10. The fault tolerant driver of claim 9 wherein the select circuit logically combines data and enable inputs from a system.

11. A transceiver, comprising:
a receiver that receives data from a data output line;
a fault tolerant driver circuit coupled to the data output line and including:
  a data output driver that receives an enable input and that couples a data output to the data output line, the data output driver including a transistor formed on an isolation well; and
  a well bias circuit that provides a well bias to the isolation well, the well bias circuit comprising voltage-controlled impedances that are controlled by a voltage of the data output line, the enable input and a supply voltage, the well bias circuit providing a second bias to the data output driver, the voltage controlled impedances connecting the second bias to: (a) a common conductor through a first impedance when the supply voltage is ON and the enable input is ON; and (b) the common conductor through a second impedance, which is higher than the first impedance, when the supply voltage is ON and the enable input is OFF.

12. The transceiver of claim 11 wherein the voltage-controlled impedances connect the well bias to the data output line voltage when the supply voltage is OFF.

13. The transceiver of claim 11 wherein the transistor comprises a field effect transistor.

14. The transceiver of claim 11 wherein the data output driver comprises a second transistor formed on a second isolation well, and the well bias circuit controls the second bias to the second isolation well.

15. The transceiver of claim 11 wherein the voltage-controlled impedances comprise a first transistor with a relatively lower ON resistance and a second transistor with a relatively higher ON resistance, the first transistor controlling the first impedance and the second transistor controlling the second impedance.

16. The transceiver of claim 11 wherein the isolation well has a coupling to the data output line, the coupling to the data output line passing alternatively through the first or second impedance as a function of the enable input.

17. The transceiver of claim 11 wherein the second impedance comprises a sufficiently high impedance that the voltage of the isolation well can be pulled to substantially the voltage of the data output line.

18. The transceiver of claim 17 wherein the data output driver comprises an output stage coupled to the data output line and a select circuit coupled between the output stage and a system.

19. A method of providing fault tolerant driver, comprising:
    forming a transistor on an isolation well in a data output driver;
    receiving an enable input at the data output driver and coupling a data output from the data output drive to a data output line;
    providing a well bias to the isolation well from a well bias circuit;
    controlling voltage-controlled impedances in the well bias circuit by voltages of the data output line, the enable input and a supply voltage, the voltage-controlled impedances connecting a second bias to:
        (a) a common conductor through a first impedance when the supply voltage is ON and the enable input is ON; and
        (b) the common conductor through a second impedance, which is higher than the first impedance, when the supply voltage is ON and the enable input is OFF.

20. The transceiver of claim 19 wherein the voltage-controlled impedances comprise a first transistor with a relatively lower ON resistance and a second transistor with a relatively higher ON resistance, the first transistor controlling the first impedance and the second transistor controlling the second impedance.

* * * * *